United States Patent [19]
Takagi et al.

[11] Patent Number: 6,109,406
[45] Date of Patent: Aug. 29, 2000

[54] LOCKUP PISTON WITH A DAMPER

[75] Inventors: Masayuki Takagi; Tadashi Watanabe; Hiroshi Yabe, all of Shizuoka-ken, Japan

[73] Assignee: NSK-Warner K.K., Tokyo, Japan

[21] Appl. No.: 09/326,711

[22] Filed: Jun. 7, 1999

[30] Foreign Application Priority Data

Jun. 5, 1998 [JP] Japan ................................. 10-194940

[51] Int. Cl.$^7$ ................................................... F16D 3/14
[52] U.S. Cl. ............................................ 192/3.29; 192/212
[58] Field of Search ................................ 192/3.29, 205, 192/212, 214, 214.1; 464/66, 67

[56] References Cited

U.S. PATENT DOCUMENTS

| | | | |
|---|---|---|---|
| 4,702,721 | 10/1987 | Lamarche | 464/67 |
| 5,772,515 | 6/1998 | Yamakawa et al. | 464/67 |
| 5,826,688 | 10/1998 | Arhab et al. | 192/3.29 |

*Primary Examiner*—Rodney H. Bonck
*Attorney, Agent, or Firm*—Evenson, McKeown, Edwards & Lenahan, P.L.L.C.

[57] ABSTRACT

A lockup piston is provided with a damper. This lockup piston is useful in a torque converter having a lockup clutch. The lockup piston is composed of a disk-shaped core plate, which has an outer peripheral flange and a friction member fixedly secured on a side of the core plate, and of a retainer plate fixedly secured on an opposite side of the core plate and carrying a spring thereon. The disk-shaped core plate is provided thereon with convexities along opposite radial edges of the retainer plate, respectively.

4 Claims, 5 Drawing Sheets

LOCKUP PISTON WITH A DAMPER

BACKGROUND OF THE INVENTION a) Field of the Invention

This invention relates to a lockup piston with a damper, which is suitable for use in a torque converter.

b) Description of the Related Art

To facilitate the understanding of the present invention, reference is first had to FIGS. 7 and 8 of the accompanying drawings, in which FIG. 7 illustrates the basic construction of a torque converter equipped with a lockup clutch and FIG. 8 is an enlarged view of a conventional lockup piston. In these drawings, there are shown a torque converter main body 10, a connection portion 1 to an engine output shaft, a pump 2, a turbine 3, a stator 4, a turbine hub 5, a central axis 6, a power input casing 21, a core plate 22, retainer plates 23 fixed at crimped portions 26 thereof on the core plate 22, and tabs 24 each located on a radially inner side of a corresponding spring 32 which is in turn arranged on a radially inner side of an outer peripheral flange 28 of the core plate 22. Each of these tabs 24 has been formed by radially slitting an outer peripheral portion of its corresponding retainer plate 23 at two locations apart from each other to divide the outer peripheral portion into a central part and side parts, with which the central part is flanked, and then bending the central part in a direction toward the turbine 3. The core plate 22 and the retainer plates 23, in combination, make up a piston of the lockup clutch.

Designated at numeral 25 are spring end face support members. Each of these spring end support members 25 has been formed by bending one of the side parts of the outer peripheral portion of the corresponding retainer plate 23 into a turned square U-shape with the open face of the U rendered broader and directed toward the turbine 3. There are also shown a friction member 27 of the clutch, and a driven plate 31.

Since the technology of torque converters is well known, its detailed description is omitted herein. It is however to be noted that, when an input shaft and an output shaft become equal in rpm, occurrence of a slip cannot be avoided between fluid couplings.

To cope with this problem, a lockup clutch is arranged. When a hydraulic pressure is applied on a right side of the core plate 22 as viewed in FIG. 7 to bring the core plate 22 into contact under pressure with the input casing 21, the core plate 22 and the input casing 21 are connected directly with each other. Rotation of the core plate 22 is hence transmitted to the driven plate 31 via the springs 32. Since the driven plate 31 is fixed on the turbine 3, the input casing 21 and an output shaft are directly connected with each other via a damper which includes the springs 32. This has made it possible to avoid any slip.

As has been described above, a conventional lockup piston equipped with such a damper is arranged by crimping a retainer plate on which a spring is carried. Size and weight reductions are, however, under way with respect to automatic transmissions in which torque converters are arranged. To meet this trend, developments are also under way toward smaller and lighter torque converters. However, any attempt to reduce the size of each retainer plate of a lockup clutch, said retainer plate carrying a spring thereon, leads to a smaller crimped area. As a result, the force which binds the retainer plate with the core plate is reduced to a level lower than the conventional binding force. In general, this binding force consists in combination of resistance to shear force applied from a counterpart member, said resistance being hereinafter to be referred to as "anti-shear force", and resistance to force exerted in a direction to separate the retainer plate from the core plate. Of these, insufficient anti-shear force is particularly concerned. Described specifically, insufficient anti-shear force involves a potential problem in that the lockup piston may fail to exhibit sufficient function in transmitting a torque.

SUMMARY OF THE INVENTION

To solve the above-described drawback of the conventional damper-equipped lockup piston, the present invention has as a primary object the provision of a lockup piston with a damper, which is provided with sufficient anti-shear force even when the lockup piston is formed in a small size.

To achieve the above object, the present invention provides in one aspect thereof a lockup piston with a damper, said lockup piston being useful in a torque converter having a lockup clutch, and said lockup piston being composed of a disk-shaped core plate, which has an outer peripheral flange and a friction member fixedly secured on a side of the core plate, and of a retainer plate fixedly secured on an opposite side of the core plate and carrying a spring thereon, wherein the disk-shaped core plate is provided thereon with convexities along opposite radial edges of the retainer plate, respectively.

In another aspect of the present invention, there is also provided a lockup piston with a damper, said lockup piston being useful in a torque converter having a lockup clutch, and said lockup piston being composed of a disk-shaped core plate, which has an outer peripheral flange and a friction member fixedly secured on a side of the core plate, and of a retainer plate fixedly secured on an opposite side of the core plate and carrying a spring thereon, wherein the disk-shaped core plate is provided thereon with convexities along opposite radial edges of the retainer plate, respectively, and also with at least one convexity along an inner peripheral edge of the retainer plate.

Preferably, these convexities may be formed by pressing the disk-shaped core plates.

These convexities can effectively bear shear force, so that the lockup pistons are improved in anti-shear force even when they are formed in small sizes.

DETAILED DESCRIPTION OF THE INVENTION AND PREFERRED EMBODIMENTS

Figure 1:
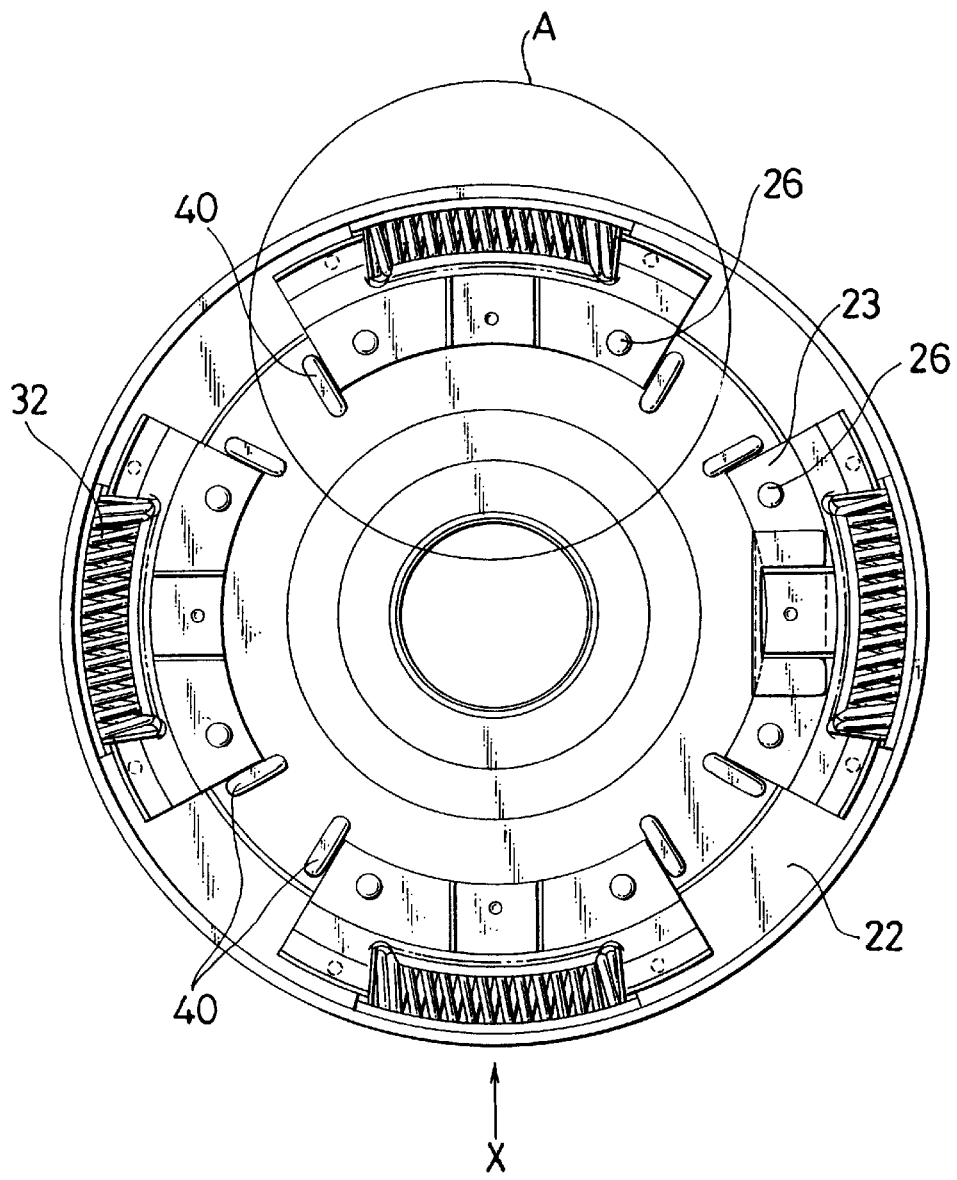
FIG. 1 is a front view of a lockup piston according to a first embodiment of the present invention.
Figure 2:
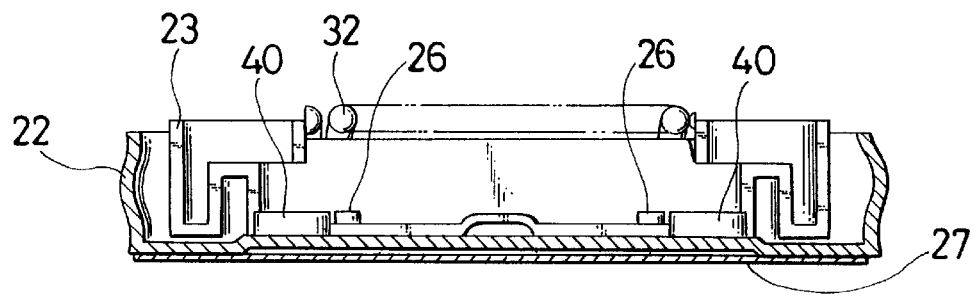
FIG. 2 is a partly cross-sectional view of a portion of the lockup piston according to the first embodiment of the present invention, said portion being indicated by a circle A in FIG. 1, as viewed in a direction X.
Figure 7:
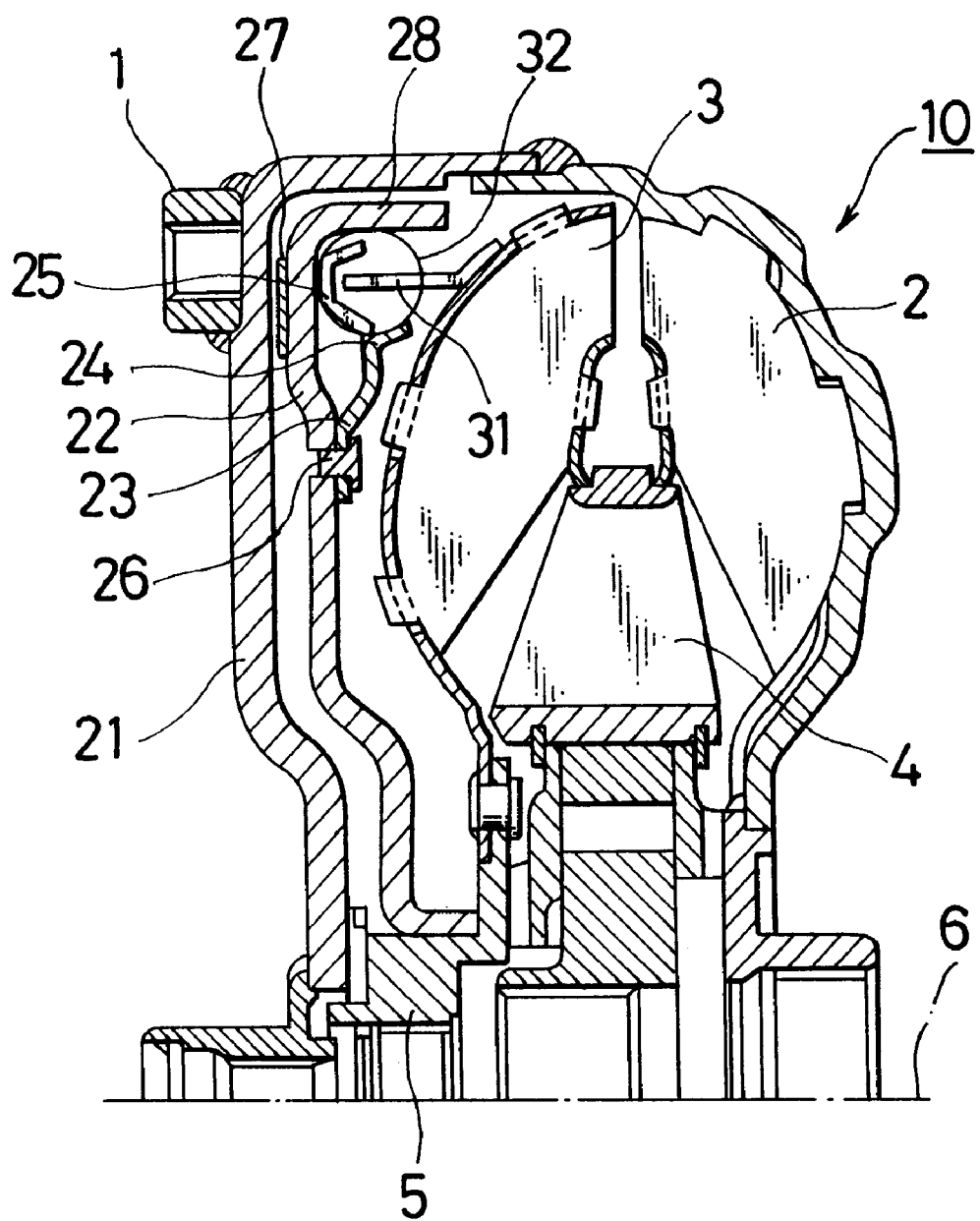
FIG. 7 is the cross-sectional view showing the construction of the torque converter provided with the lockup clutch.
Figure 8:
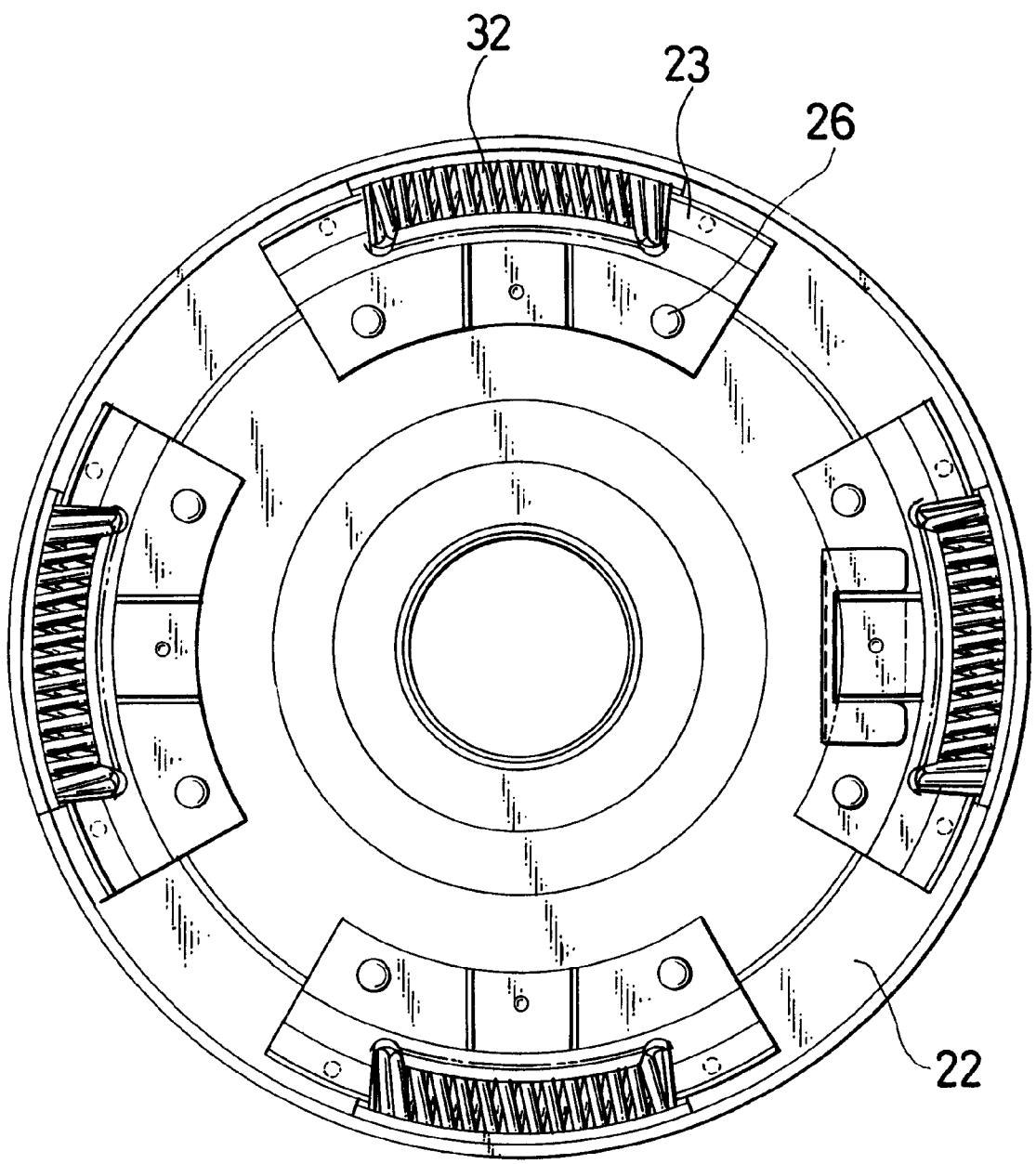
FIG. 8 is the front view of the conventional lockup piston.

Referring first to FIGS. 1 and 2, the damper-equipped lockup piston according to the first embodiment of the present invention will be described. Numeral 22 indicates a core plate, while numeral 23 designates retainer plates. Each retainer plate 23 is fixed at crimped portions 26 thereof on the core plate 22. A clutch friction member 27 bonded on the core plate 22 (see FIG. 7). Designated at numeral 32 are springs. Numeral 40 indicates convexities arranged on the core plate 22.

The convexities 40 have been formed on the core plate 22 by press working. In this embodiment, the convexities 40 are formed on outer sides of opposite radial edges of their corresponding retainer plate 23 such that they extend along the corresponding radial edges of the retainer plate, respectively.

Owing to the formation of the convexities 40 on the outer sides of the opposite radial edges of the retainer plate 23, the damper-equipped lockup piston according to the first embodiment of the present invention has anti-shear force improved over the conventional designs and in addition, makes it possible to enjoy a greater design tolerance toward the size reduction of the retainer plates.

Figure 3:
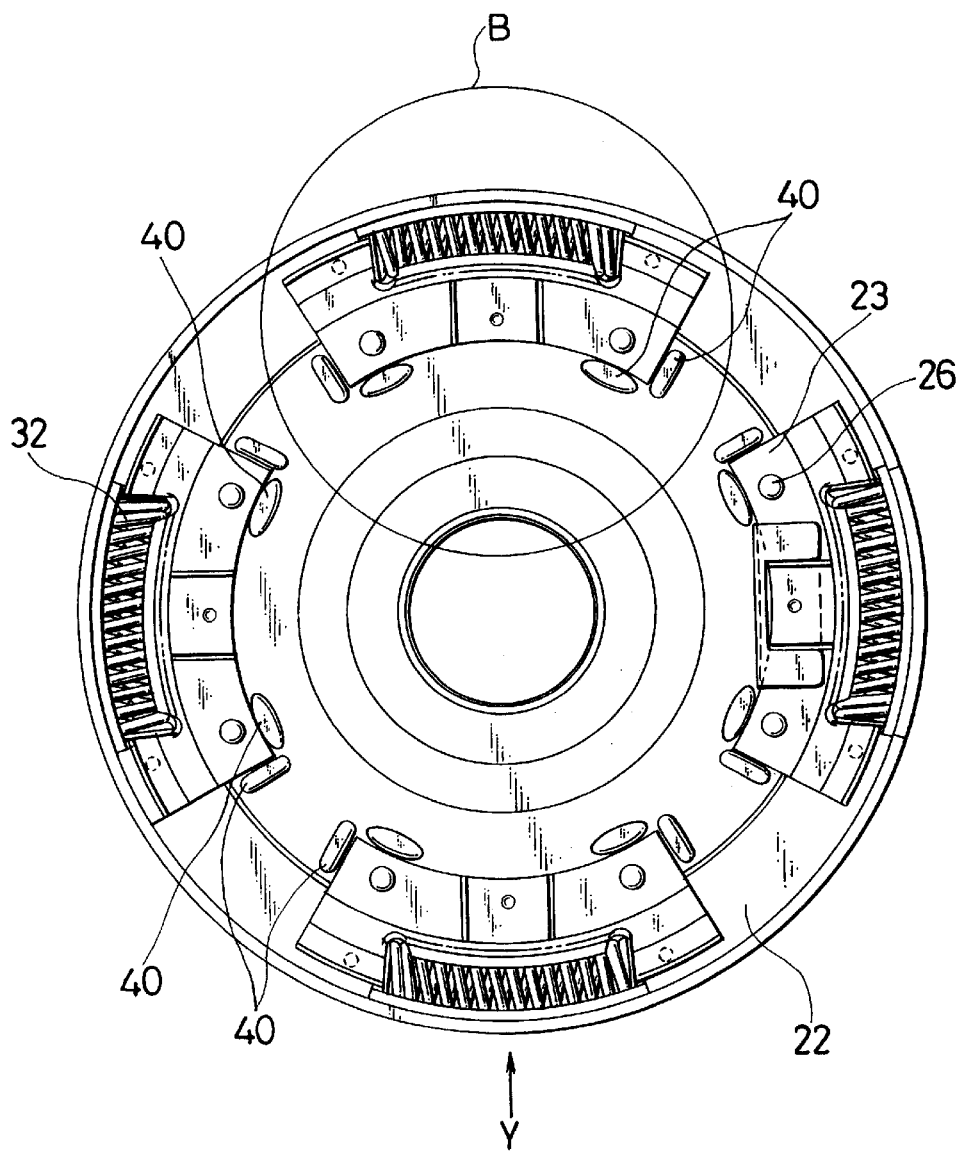
FIG. 3 is a front view of a lockup piston according to a second embodiment of the present invention.
Figure 4:
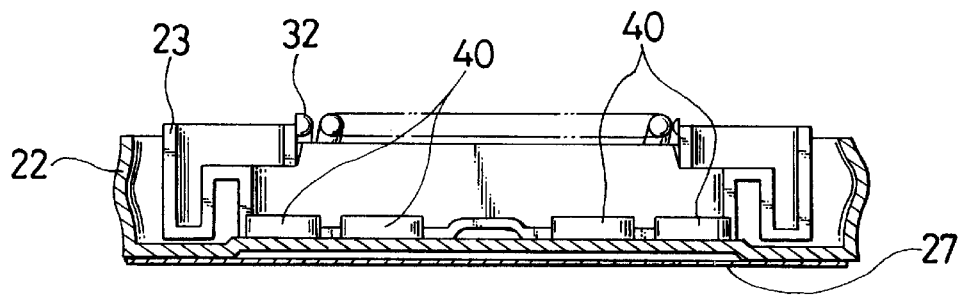
FIG. 4 is a partly cross-sectional view of a portion of the lockup piston according to the second embodiment of the present invention, said portion being indicated by a circle B in FIG. 3, as viewed in a direction Y.

The lockup piston according to the second embodiment of the present invention will next be described with reference to FIGS. 3 and 4, in which the numerals already used in FIGS. 1 and 2 indicate like elements of structure. In this second embodiment, convexities are arranged on outer sides of opposite radial edges of their corresponding retainer plates 23 and further convexities are also arranged on inner sides of inner peripheral edges of their corresponding retainer plates 23, such that they extend along the corresponding radial edges or inner peripheral edges of the retainer plates, respectively.

Owing to the above-described arrangement of the convexities, the individual retainer plates can be held in place even if large forces should be applied to the crimped portions.

Figure 5:
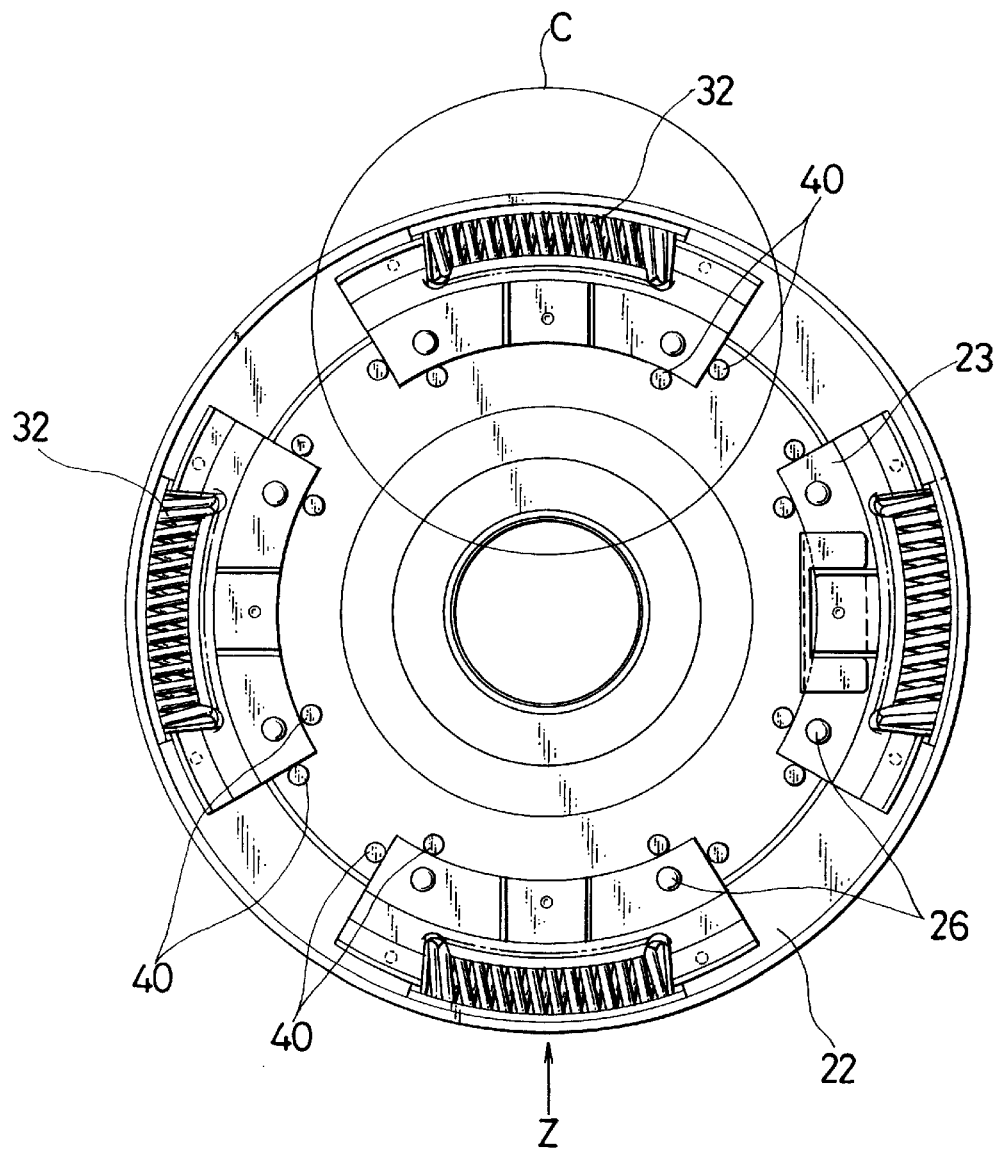
FIG. 5 is a front view of a lockup piston according to a third embodiment of the present invention.
Figure 6:
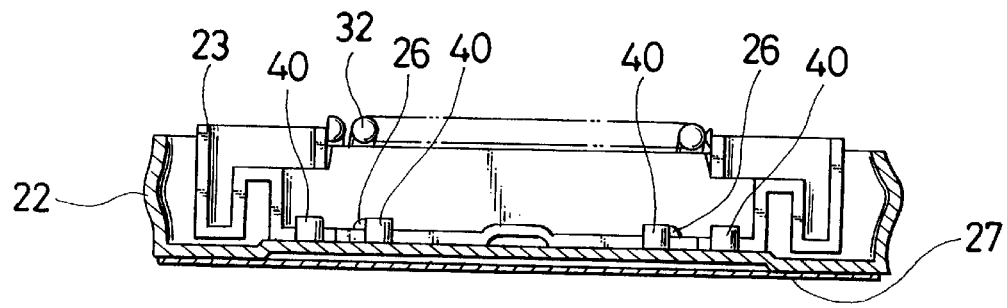
FIG. 6 is a partly cross-sectional view of a portion of the lockup piston according to the third embodiment of the present invention, said portion being indicated by a circle C in FIG. 5, as viewed in a direction Z.

With reference to FIGS. 5 and 6, the lockup piston according to the third embodiment of the present invention will now be described. In these drawings, the numerals already used in FIGS. 1 to 4 indicate like elements of structure. In this embodiment, the positions of convexities 40 are same as those of the convexities 40 in the second embodiment shown in FIGS. 3 and 4, but their are formed in the shape of cylinders. The formation of such convexities in such a shape leads to good workability.

This application claims the priority of Japanese Patent Application No. HEI 10-194940 filed Jun. 5, 1998, which is incorporated herein by reference.

What is claimed is:

1. A lockup piston with a damper, said lockup piston being used for a torque converter having a lockup clutch, and said lockup piston being composed of a disk-shaped core plate, which has an outer peripheral flange and a fiction member fixedly secured on a side of said core plate, and of a retainer plate fixedly secured on an opposite side of said core plate and carrying a spring, at substantially an outer radial distance of the core plate, thereon, wherein:

said disk-shaped core plate is provided thereon with convexities along opposite radial edges of said retainer plate, respectively, and wherein said convexities are located radially inward of the outer radial distance and hold said retainer plate in place against shear forces.

2. A lockup piston according to claim 1, wherein said convexities have been formed by pressing said disk-shaped core plate.

3. A lockup piston with a damper, said lockup piston being useful in a torque converter having a lockup clutch, and said lockup piston being composed of a disk-shaped core plate, which has an outer peripheral flange and a friction member fixedly secured on a side of said core plate, and of a retainer plate fixedly secured on an opposite side of said core plate and carrying a spring thereon, wherein:

said disk-shaped core plate is provided thereon with convexities along opposite radial edges of said retainer plate, respectively, and also with at least one convexity along an inner peripheral edge of said retainer plate.

4. A lockup piston according to claim 3, wherein said convexities have been formed by pressing said disk-shaped core plate.

* * * * *